United States Patent
Feig et al.

(10) Patent No.: US 6,182,140 B1
(45) Date of Patent: Jan. 30, 2001

(54) HOT OBJECTS WITH MULTIPLE LINKS IN WEB BROWSERS

(75) Inventors: Ephraim Feig, Chappaqua; Zoya Vydrug-Vlasenko, New York, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/121,518

(22) Filed: Jul. 23, 1998

(51) Int. Cl.[7] .................................................. G06F 15/173
(52) U.S. Cl. ........................... 709/226; 709/250; 709/225
(58) Field of Search .................................... 709/226, 225, 709/217, 223, 212, 250

(56) References Cited

U.S. PATENT DOCUMENTS

| | | | |
|---|---|---|---|
| 5,787,254 | * 1/2000 | Maddalozzo, Jr. et al. | 709/228 |
| 6,003,086 | * 12/1999 | Mitsutake et al. | 709/229 |
| 6,006,264 | * 12/1999 | Colby et al. | 709/226 |
| 6,012,087 | * 1/2000 | Freivald et al. | 709/218 |

* cited by examiner

*Primary Examiner*—Zarni Maung
(74) *Attorney, Agent, or Firm*—Ohlandt, Greeley, Ruggiero & Perle, L.L.P.

(57) ABSTRACT

A computer implemented method enables user access, over a network, to a resource which can be accfessed from any one of a plurality of sites. The method initially stores a control data structure which includes (i) a plurality of site addresses where copies of the resource reside and (ii) an entry which enables access to a procedure that defines a criteria for selecting one of the plurality of site addresses from which to access a copy of the resource. Next a Web page is displayed, having a region which indicates the resource. The method then responds to a user's selection of the region, by accessing the control data structure and executing the procedure so as to enable access by the user to the resource in accord with the selection criteria, without requiring further input by the user.

15 Claims, 2 Drawing Sheets

Location   http://www.internet...

Download Resource...for
Application

Public Site #1
Public Site #2
Public Site #3
Public Site #4

FIG.1

Location | http://www.internet...

Download Application X ⁓32
Download Application Y ⁓34

HOT OBJECTS WITH MULTIPLE LINKS IN WEB BROWSERS

FIELD OF THE INVENTION

This invention relates to a method and means for enabling a user to access, via a network, one of a plurality of resource copies located at plural site addresses and, more particularly, to a browser application that determines which of a plurality of hyperlinks to utilize to access the resource copy.

BACKGROUND OF THE INVENTION

A hypertext document is one which is linked to other documents via hyperlinks. A hyperlink often appears in a hypertext document as highlighted text. The text is usually a word or phase, describing something for which a user might want further information. When the user activates the hyperlink, typically by clicking on it using a mouse, the screen presentation is changed so as to show the linked document, which typically contains more information on the highlighted word or phrase. Hyperlinks make it easy to follow cross-references between documents.

Hypermedia documents are hypertext documents with multimedia capabilities. The regions on the screen which include active hyperlinks are called hot-links.

Users are generally familiar with the application of hypertext by using a mouse to click on hot-links on computer displays of homepages from the World Wide Web (the "Web") on the Internet. Data on the Web is located via URLs, i.e., "Uniform Resource Locators." A URL is used to specify an object on the Internet. It specifies access method and the location of the file(s). Documents on the Web are written in a "markup language" called HTML, i.e., "Hypertext Markup Language". File formats of data on the Web are specified as MIME formats, i.e., "Multipurpose Internet Mail Extensions."

Examples of file formats on the Web are ".au" (probably the most common audio format), ".html" (HTML files), ".jpg" (JPEG encoded images), ".mid" (Midi music format), ".mpg" (MPEG encoded video), and ".ps" (PostScript files).

Browsers are computer programs that make convenient the viewing and maneuvering of HTML documents on the Web. Presently, the two most popular browsers are Netscape's Navigator and Microsoft's Internet Explorer. They both provide a graphical user interface with standard point-and-click navigation methods and support HTML files.

Java is a programming language designed with the Internet in mind. Browsers which support Java can run Java applets, which are programs that can be downloaded from remote servers and run on the fly, without a-priori compilation or installation.

Hot objects in HTML files are each linked to a unique URL. Often it is desirable to have a hot object be linked to one of a plurality of URLs, the particular one depending upon the state of the Internet at the particular time that a user makes a request. For example, frequently, a user who desires to download a large file is given a choice of several URLs from which to obtain the file. This is accomplished by displaying a Web page which directs the viewer to download a program from one of four public sites (e.g., #1–#4). See FIG. 1 as a schematic example of such a Web page.

The reason for giving the user this choice is that the file provider expects its servers (those computers which house the URLs) to be very busy, and should one of them be too busy to service the request, the user can try another one. The user selects one and waits for a response. The user does not know if he/she made the best choice for the fastest delivery of the file.

Table 1 below gives the HTML source code for that portion of the web page of FIG. 1 which contains the heading plus the hotlinks for the four public sources. It can be seen that, except for the machine names (service2, service3, ism and service4) the URLs are identical.

TABLE 1

<CENTER><P><B><FONT SIZE=+1>Download Netscape Navigator for OS/2 Warp Plug-in Programmer's Toolkit (123K)<BR>
<A HREF="ftp://service2.boulder.ibm.com/software/netscape/os2plug.exe">Public Site #1</A> •
<A HREF="ftp://service3.boulder.ibm.com/software/netscape/os2plug.exe">Public Site #2</A> •
<A HREF="ftp://ism.boulder.ibm.com/software/netscape/os2plug.exe">Public Site #3</A> •
<A HREF="ftp://service4.boulder.ibm.com/software/netscape/os2plug.exe">Public Site #4</A> •
</FONT></B></P></CENTER>

While such a Web page does provide the user with the option of choosing from among four public sites, it provides no information regarding the ability of any site to accommodate a user's information request, the delay the user will experience at each site before a response is dispatched, etc., etc. Nor is the system in any way set up to provide automatic and intelligent direction of the user's query to a public site in such a manner as to provide a most rapid response.

Accordingly, it is an object of this invention to provide a browser with an ability to respond to a user query, by intelligently choosing from among a plurality of public sites which contain data requested by the query.

It is another object of the invention to provide a user with a displayed "hot" object which automatically direct the user's query to one of a plurality of URLs which can respond to the user's query, the choice being made based upon determined criteria.

It is a further object of the invention to provide a user with a displayed "hot" object which automatically direct the user's query to one of a plurality of URLs which can respond to the user's query, the choice being made based upon which URL can deliver a response file fastest.

SUMMARY OF THE INVENTION

A computer implemented method enables user access, over a network, to a resource which can be accessed from any one of a plurality of sites. The method initially stores a control data structure which includes (i) a plurality of site addresses where copies of the resource reside and (ii) an entry which enables access to a procedure that defines a criteria for selecting one of the plurality of site addresses from which to access a copy of the resource. Next a Web page is displayed, having a region which indicates the resource. The method then responds to a user's selection of the region, by accessing the control data structure and executing the procedure so as to enable access by the user to the resource in accord with the selection criteria, without requiring further input by the user.

BRIEF DESCRIPTION OF THE DRAWINGS

FIG. 1 is a schematic of a Web page indicating the availability of a plurality of sites which can respond to a user query.

FIG. 3 is a schematic of a simplified Web page used with the invention.

DETAILED DESCRIPTION OF THE INVENTION

Figure 2:
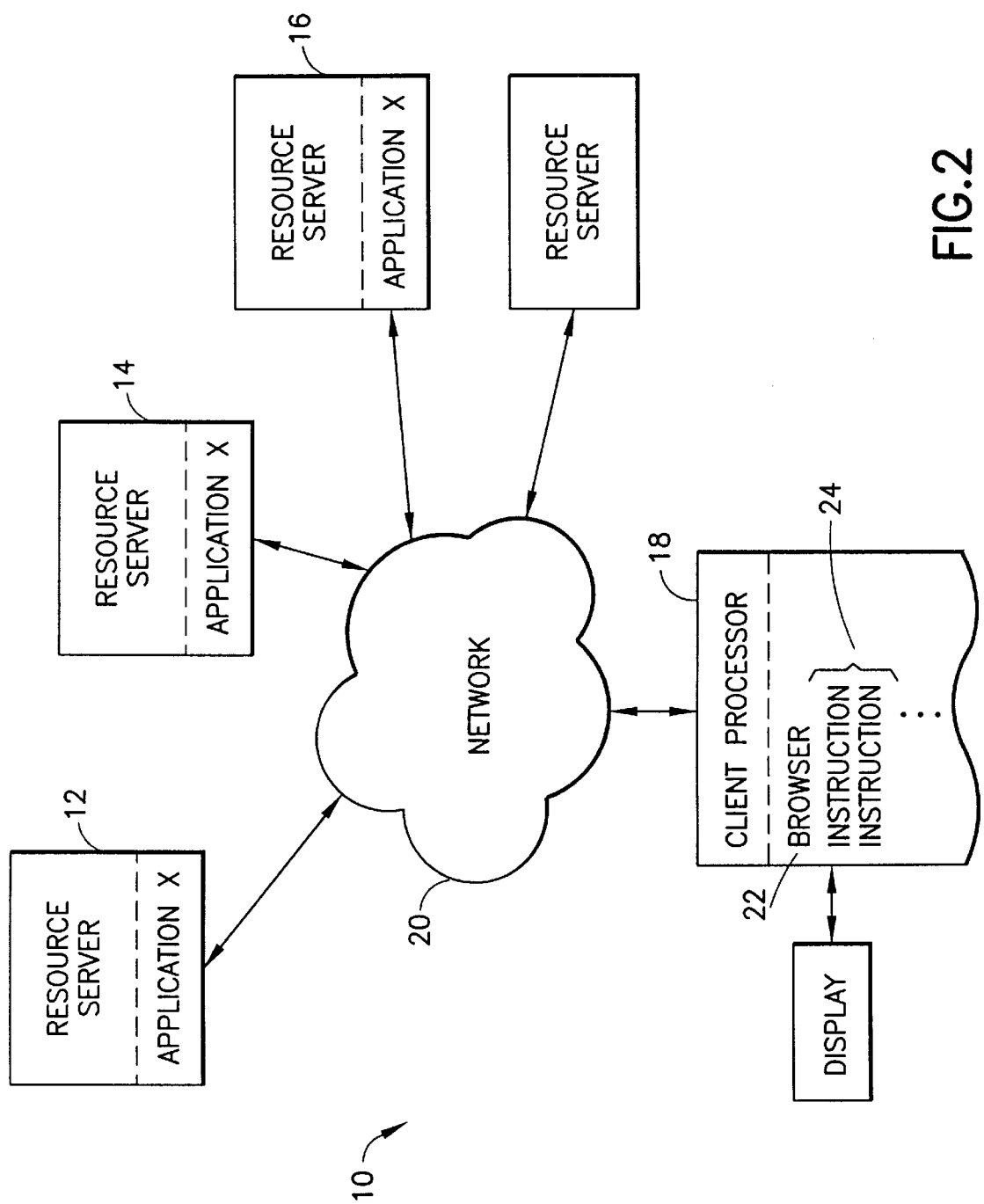
FIG. 2 is a block diagram illustrating the configuration of a system adapted to carry out the invention hereof.

The present invention extends a standard HTML browser to support a new datatype, mURL, i.e., "multiple Universal Resource Locator". The structure of an mURL datatype is as follows:

<URL1;URL2; . . . ; . . . ; . . . ;URLn;INSTRUCTIONS>

It comprises an ordered list of URLs and an appended program called "INSTRUCTION" which the browser can execute, and which determines which of the URLs will be accessed when an associated hot object is clicked. Table 2 gives a detailed view of this datatype.

TABLE 2

<CENTER><P><B><FONT SIZE=+1>Download Netscape Navigator for OS/2 Warp Plug-in
Programmer's Toolkit (123K)<BR>
<MA MREF =
<A HREF1="ftp://service2.boulder.ibm.com/software/netscape/os2plug.exe"</A>
<A HREF2="ftp://service3.boulder.ibm.com/software/netscape/os2plug.exe"</A>
<A HREF3="ftp://ism.boulder.ibm.com/software/netscape/os2plug.exe"</A>
<A HREF4="ftp://service4.boulder.ibm.com/software/netscape/os2plug.exe"</A>
<A INST="1"</A>Download Now </MA>
</FONT></B></P></CENTER>

An mURL consists of a list of URLs (URL1, URL2, . . . ) coupled with labels (HREF1, HREF2, . . . ). The beginning of an mURL is labeled with the special symbol <MA. The mURL is itself assigned a label MREF. The individual URLs comprising an mURL have the syntax of standard URLs in HTML. After the last URL in an mURL list is the INSTRUCTION segment, which, like the URLs, has a beginning symbol <A and an end symbol </A>. The INSTRUCTION itself is either an index (a number) to an indexed set of programs in the browser itself, or to a code for some specific set of INSTRUCTIONs which the browser can execute. In the preferred implementation, the browser is Java enabled, and the code is a Java applet. The end of an mURL is the special symbol </MA>.

The preferred embodiment has plural "INSTRUCTION" programs embedded in the browser. The index is an eight bit number. It can thus support 255 different programs, each of which can be embedded in the browser. An index 11111111 is a special escape code which informs the browser that the INSTRUCTION is none of the embedded INSTRUCTIONS, but is appended as the last field in the mURL. The embedded INSTRUCTIONS all have prefixes, which are the indices associated with them. The following are exemplary INSTRUCTIONs.

A first INSTRUCTION program controls the browser to traverse, in order, the list of the URLs in the mURL, attempting to access the sites to which each URL points. The program stops as soon as it finds a site which is accessible, and opens that site.

A second INSTRUCTION program controls the browser to traverse, in order, the list of the URLs in the mURL, attempting to access the sites to which each URL points. If a site is inaccessible, the browser marks it as such and makes no further attempts to contact it. If a site is reached, the browser begins a download process for a short period of time (several seconds) in order to determine the bandwidth linking the site. When bandwidth estimates are completed for all accessible URLS, the one with the highest bandwidth is accessed and the download process commences. If there is a tie for the highest bandwidth, the browser downloads from the first (in the list order) of those sites with the highest bandwidth.

The third INSTRUCTION program controls the browser to first determine the bandwidth which the host computer supports. The browser interrogates the operating system network manager and determines the bandwidth B of the link to the computer. Then the browser traverses, in order, the list of the URLs in the mURL, attempting to access the sites to which each URL points. If a site is inaccessible, the browser marks it as such and makes no further attempts to contact it. If a site is reached, the browser begins the download process for a short period of time (several seconds) in order to determine the bandwidth linking the site. If the bandwidth is B, the browser stops the search process and links to that site. Otherwise it continues until it scans all the sites, and then selects the site with the highest bandwidth. If there is a tie for the highest bandwidth, the browser downloads from the first (in the list order) of those sites with this highest bandwidth.

Accordingly, the user, who configures a Web page with a hyperlink to plural resource sites, appends an index to the selected INSTRUCTION to the list of URLs that comprise the mURL. Then, when a user selects the hyperlink by clicking on it, the browser automatically invokes the selected INSTRUCTION and performs the required procedure to select a URL that is best able to provide a response to the user's request.

The invention is not restricted to multiple links to identical actions. For example, an mURL may have multiple links to URLs with very different content, with the INSTRUCTION randomly choosing one of them. Or, the INSTRUCTION may call for the browser to determine the time of day, and then select a site or one site from a collection of sites which can be viewed at that certain time. Or the INSTRUCTION may include a process which records the visited sites in a local file and has the program cycle through the various sites using a prescribed protocol.

Referring now to FIG. 2, a communication system 10 includes a plurality of resource servers 12, 14, 16, etc., each of which includes a copy of data that is available for response to queries. Each resource server is accessible via a unique address (e.g., a URL). A client processor 18 has access to the various resource servers via network 20 (e.g., the Internet). Client processor 18 includes a browser procedure 22 which enables communication between client processor 18 and each of resource servers 12, 14, 16, etc. Browser procedure includes a plurality of INSTRUCTION programs 24, each of which can be invoked in response to respective unique index values.

During operation of browser procedure 22 by a user, assume that a Web page 30 (shown in FIG. 3) is downloaded to client processor 18 from a Resource server. Each hotspot 32, 34, etc. on Web page 30 has an associated mURL that is downloaded to client processor 18 along with Web page 30. Assuming the user wishes to access further information regarding Application X (hotspot 32), the user places a cursor over hotspot 32 and clicks on it. In response, the mURL associated with hotspot 32 is accessed. That mURL takes the form described above and includes an index to one of INSTRUCTION programs 24.

Accordingly, the indexed INSTRUCTION program 24 is invoked and, in combination with the URLs that form a portion of the mURL, enable one of resource servers 12, 14, 16, etc . . . to be accessed. The INSTRUCTION program assures that the accessed resource server is the one that, for instance, can respond most quickly to the user's query.

In summary, the invention provides a datatype mURL (multiple Universal Resource Locator) which is incorporated in extended html files, the extension allowing for the new datatype. The datatype comprises a list of URLs and an index to a list of INSTRUCTIONs. A browser which supports this datatype is capable of determining which of the URLs on the mURL list to go to when the associated object is selected. Such determination is made based on the index to the list of INSTRUCTIONs in the mURL. The list of INSTRUCTIONs may cause the browser to: go to the first URL in the mURL list which is active; go to the first URL in the mURL list which is active and can support a bandwidth at least as high as some specified value, and should none of them support such bandwidth, go to the URL which supports the highest bandwidth; go to the URL in the mURL list which supports the highest bandwidth; proceed according to appended INSTRUCTIONs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer implemented method for enabling user access, over a network, to a resource located at a plurality of sites, said method comprising the steps of:
    a) storing a data structure which includes (i) a plurality of different site addresses where said resource resides and (ii) an entry which enables access to a procedure, said procedure defining a criteria for selecting one of said plurality of site addresses from which to access said resource;
    b) displaying a page having a region which indicates said resource;
    c) responding to a user's selection of said region, by accessing said data structure and executing said procedure so as to enable access by said user to said resource in accord with said criteria for selecting, without requiring further input by the user.

2. The method as recited in claim 1, wherein said data structure comprises an ordered list of said site addresses and wherein said criteria controls said procedure to select a first active site address from said ordered list of site addresses for the case where one or more of the site addresses are inactive.

3. The method as recited in claim 1, wherein said data structure comprises an ordered list of said site addresses and said criteria controls said procedure to interrogate processors at all said site addresses to determine a communication bandwidth supported by each and to select a site address whose processor supports a highest communication bandwidth.

4. The method as recited in claim 1, wherein said data structure comprises an ordered list of said site addresses and said criteria controls said procedure to interrogate processors at all said site addresses to determine a site which can support a communication bandwidth of a specified magnitude or greater and should no site support such a communication bandwidth, to select a site address which supports a highest bandwidth.

5. The method as recited in claim 1, wherein said data structure comprises an ordered list of said site addresses and said criteria controls said procedure to select a random one of said site addresses.

6. A memory media for controlling a computer to enable a user to access, over a network, a resource located at each of a plurality of sites, said memory media comprising:
    a) means for controlling said computer to store a data structure which includes (i) a plurality of site addresses where said resource resides and (ii) an entry which enables access to a procedure, said procedure defining a criteria for selecting one of said plurality of site addresses from which to access said resource;
    b) means for controlling said computer to display a page having a region which indicates said resource; and
    c) means for controlling said computer to respond to a user's selection of said region, by accessing said data structure and executing said procedure so as to enable access by said user to said resource, in accord with said criteria for selecting one of said plurality of site addresses, without requiring further inputs by the user.

7. The memory media as recited in claim 6, wherein said data structure comprises an ordered list of said site addresses and said means c) utilizes said criteria to control said procedure to select a first active site address from said ordered list of site addresses for the case where one or more of the site addresses are inactive.

8. The memory media as recited in claim 6, wherein said data structure comprises an ordered list of said site addresses and said means c) utilizes said criteria to control said procedure to interrogate processors at all said site addresses to determine a communication bandwidth supported by each and to select a site address whose processor supports a highest communication bandwidth.

9. The memory media as recited in claim 6, wherein said data structure comprises an ordered list of said site addresses and said means c) utilizes said criteria to control said procedure to interrogate processors at all said site addresses to determine a site which can support a communication bandwidth of a specified magnitude or greater and should no site support such a communication bandwidth, to select a site address which supports a highest bandwidth.

10. The memory media as recited in claim 6, wherein said data structure comprises an ordered list of said site addresses and said means c) utilizes said criteria to control said procedure to select a random one of said site addresses.

11. A method for extending the capability of a browser, said method comprising:
    a) configuring a web page having a region that indicates a resource;
    b) embedding in said web page a data structure which includes (i) a plurality of different site addresses where said resource resides and (ii) an entry which enables access to a procedure, said procedure defining a criteria for selecting one of said plurality of site addresses from which to access said resource; and
    c) presenting said web page to a browser, wherein said procedure is executable by said browser when said region is selected so as to enable access by said browser to said resource in accord with said criteria for selecting, without requiring further input by a user of the browser.

12. The method as recited in claim 11, wherein said data structure comprises an ordered list of said site addresses and wherein said criteria controls said procedure to select a first active site address from said ordered list of site addresses for the case where one or more of the site addresses are inactive.

13. The method as recited in claim 11, wherein said data structure comprises an ordered list of said site addresses and wherein said criteria controls said procedure to interrogate processors at all said site addresses to determine a communication bandwidth supported by each and to select a site address whose processor supports a highest communication bandwidth.

14. The method as recited in claim 11, wherein said data structure comprises an ordered list of said site addresses and wherein said criteria controls said procedure to interrogate processors at all said site addresses to determine a site which can support a communication bandwidth of a specified magnitude or greater and should no site support such a communication bandwidth, to select a site address which supports a highest bandwidth.

15. The method as recited in claim 11, wherein said data structure comprises an ordered list of said site addresses and said criteria controls said procedure to select a random one of said site addresses.

* * * * *